(12) United States Patent
Stewart et al.

(10) Patent No.: US 7,549,123 B1
(45) Date of Patent: Jun. 16, 2009

(54) MIXING INPUT CHANNEL SIGNALS TO GENERATE OUTPUT CHANNEL SIGNALS

(75) Inventors: William George Stewart, Cupertino, CA (US); Michael Stephen Hopkins, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 11/154,196

(22) Filed: Jun. 15, 2005

(51) Int. Cl.
*G06F 3/16* (2006.01)
*G06F 3/00* (2006.01)
*H04B 1/00* (2006.01)
*H03G 3/20* (2006.01)

(52) U.S. Cl. .................. 715/727; 715/716; 381/119; 381/61

(58) Field of Classification Search ............ 715/727; 381/119, 61; 700/94
See application file for complete search history.

(56) References Cited

U.S. PATENT DOCUMENTS

| 5,212,733 | A * | 5/1993 | DeVitt et al. ............ 381/119 |
| 5,581,618 | A * | 12/1996 | Satoshi et al. ............ 381/17 |
| 5,736,982 | A * | 4/1998 | Suzuki et al. ............ 715/706 |
| 6,459,797 | B1 * | 10/2002 | Ashour et al. ............ 381/18 |
| 6,934,395 | B2 * | 8/2005 | Ito ............ 381/23 |
| 6,977,653 | B1 * | 12/2005 | Cleary et al. ............ 345/440 |
| 7,158,844 | B1 * | 1/2007 | Cancilla ............ 700/94 |
| 7,190,794 | B2 * | 3/2007 | Hinde ............ 381/17 |
| 2002/0172370 | A1 * | 11/2002 | Ito ............ 381/18 |
| 2005/0081164 | A1 * | 4/2005 | Hama et al. ............ 715/830 |
| 2005/0157894 | A1 * | 7/2005 | Andrews et al. ............ 381/307 |

OTHER PUBLICATIONS

Apple Computer, Inc., "Logic Express 7, Create and Produce Music Like a Pro," retrieved from the internet at <http://www.apple.com/logicexpress/>, retrieved on Sep. 13, 2005, 3 pages.

* cited by examiner

*Primary Examiner*—Doug Hutton
*Assistant Examiner*—Henry Orr
(74) *Attorney, Agent, or Firm*—Hickman Palermo Truong & Becker LLP; Christian A. Nicholes

(57) ABSTRACT

Techniques for mixing multiple input channel signals into multiple output channel signals are provided. A graphical user interface (GUI), which includes multiple indicators, is displayed. The input channel signals are mixed to produce multiple output channel signals. The mixing is performed based on the distance between the indicators' positions in the GUI. According to one embodiment of the invention, the mixing is also performed based on the angle formed between the indicators. Thus, the extent to which an input channel signal is carried by an output channel signal is, in one embodiment of the invention, a function of both the distance between the indicators and an angle formed by the indicators in the GUI.

18 Claims, 3 Drawing Sheets

MIXING INPUT CHANNEL SIGNALS TO GENERATE OUTPUT CHANNEL SIGNALS

FIELD OF THE INVENTION

The present invention relates to audio signal mixing techniques and, more specifically, to a technique for mixing multiple input channel signals, based on locations of indicators in a GUI, to generate multiple output channel signals.

BACKGROUND

There exist many computer programs today that assist a user in generating output audio channel signals based on an input audio channel signal. For example, an audio mixing program may read a single input channel signal and distribute the signal over two separate output channel signals—typically, a "left" channel signal and a "right" channel signal—thus converting "mono" sound into "stereo" sound.

According to one approach, when an input channel signal is distributed over two output channel signals in this way, the volume, or intensity, of each of the output channel signals may be kept the same relative to each other; each of the output channel signals will be equally as loud as the other if each of the output channel signals receives the same "amount" of the input channel signal as the other, speaking in terms of intensity. Under such an approach, for example, if the input channel signal is at an intensity level of X decibels at a particular moment in time, then each of the output channel signals would also be at an intensity level of X decibels at the particular moment in time; the intensity levels of each of the output channel signals would change in accordance with the intensity level of the input channel signal.

However, according to one approach, an input channel signal may be distributed unequally over two output channel signals. For example, the "left" output channel signal may be adjusted to have a lower intensity level than the "right" output channel signal at a particular moment in time, so that, upon playback of both output channel signals concurrently, more of the input channel signal is heard from a "right" speaker than a "left" speaker at the particular moment in time.

In an audio mixing program, a graphical user interface (GUI) control is often provided to allow a user to selectively allocate the intensity of an input channel signal among two output channel signals over time. The process of allocating the input channel signal over time is called "panning," and the control by which the user selects the allocation of the input channel signal over time is called a "panning knob."

For example, a panning knob may take the appearance of a circle or dial, upon or near the perimeter of which an indicator is marked. As the user "turns" the knob counterclockwise (using a mouse, keyboard, or other input device), the indicator rotates along the perimeter toward the leftmost degree of the knob. Conversely, as the user "turns" the knob clockwise, the indicator rotates along the perimeter toward the rightmost degree of the knob. Thus, under one approach, the panning knob resembles, in appearance, a physical knob on a conventional radio, similar to the kind used to select volume and radio frequency, for example.

A user may turn the panning knob while an input channel signal is being distributed among two output channel signals. At any moment in time while the input channel signal is being "recorded" to the output channel signals, the attitude of the panning knob determines how much of the input channel signal is allocated to the "left" output channel signal at that moment, and how much of the input channel signal is allocated to the "right" output channel signal at that moment.

According to one approach, when the panning knob is turned all the way counterclockwise, so that the indicator is positioned toward the leftward edge of the knob, all of the input channel signal is allocated to the left output channel signal, and none of the input channel signal is allocated to the right output channel signal, speaking in terms of intensity. As the panning knob is turned clockwise from this attitude, more of the input channel signal is allocated to the right output channel signal, and less of the input channel signal is allocated to the left output channel signal, speaking again in terms of intensity. As would be expected, when the panning knob is turned all the way clockwise, so that the indicator is positioned toward the rightward edge of the knob, all of the input channel signal is allocated to the right output channel, and none of the input channel signal is allocated to the left output channel, speaking in terms of intensity once more.

Thus, at any moment during the distribution of a mono audio signal between two stereo audio signals, a user can turn the panning knob to control how much of the mono audio signal is carried by each of the two stereo audio signals at that moment. In other words, the user can turn then panning knob to control the intensities of each of the two stereo audio signals relative to each other at any moment in time. Over time, the relative intensities of the output channel signals may vary.

The panning knob described above may be largely adequate when there are exactly two output channel signals among which an input channel signal is to be distributed, but is less adequate under circumstances where an input channel signal needs to distributed between more than two output channel signals. For example, there may be a need to distribute an input channel signal between four separate output channel signals: a "left" output channel signal, a "right" output channel signal, a "front" output channel signal, and a "back" output channel signal.

A more suitable GUI panning control may be employed under such circumstances. According to one approach, this panning control takes the form of an outer circle or ring that encompasses a smaller indicator that can be positioned variably anywhere within the outer circle. For example, a user may use a mouse to drag the indicator from one position within the circle to another position within the circle. Similar to the way that a leftmost position and rightmost position on the perimeter of the panning knob described above corresponded to left and right output channel signals, respectively, different positions along the perimeter of the panning control's outer circle may correspond to separate output channel signals. For example, the positions at 0, 90, 180, and 270 degrees on the perimeter may correspond to "right," "front," "left," and "back" output channel signals, respectively. The proximity of the indicator to each of these positions at a particular moment determines how much of the input channel signal is allocated to each of the corresponding output channel signal at the particular moment.

For example, when the indicator is positioned exactly at the center of the outer circle, an equal amount of the input channel signal may be allocated to each of the output channel signals, speaking in terms of intensity. If the indicator is moved toward the perimeter of the outer circle, then the input channel signal may be allocated to a greater extent to the output channel signals that correspond to the perimeter positions that the indicator has moved toward, and to a lesser extent to the output channel signals that correspond to the perimeter positions from which the indicator has moved away. For example, if there are four maximally-spaced perimeter positions along the outer circle, as described above, then when the indicator is positioned at the topmost center edge of the outer circle (i.e., at 90 degrees on the perimeter), the "front" output channel signal will have the greatest intensity of all, the "left" and "right" output channel signals will have somewhat less intensity than when the indicator was positioned in the exact center of the outer circle, and the "back" output channel signal will have the least intensity of all—its corresponding position being the farthest from the indicator's position.

The above approach can be extended to accompany any number of output channel signals; each output channel signal may correspond to a different position on the outer circle's perimeter. In the example described above, the positions are maximally distanced from each other on the outer circle's perimeter, but they do not need to be. For example, a first, second, and third output channel signal might correspond to positions at 45, 90, and 135 degrees, respectively, along the outer circle's perimeter. The number of output channel signals and their corresponding positions along the outer circle's perimeter may be user-determinable.

The foregoing approaches are useful for distributing, intensity-wise, a single input channel signal among multiple output channel signals. However, the foregoing approaches suffer from some inadequacies when more than one input channel signal needs to be distributed among multiple output channel signals. Typically, in situations where a recorded sound occupies multiple channel signals, the channel signals bear some spatial relationship to each other. For example, in the case of music originally recorded in stereo, the music might be received, at recording time, through two separate microphones spaced at some distance from each other and the source(s) of the music. The sound recorded via one microphone might be recorded into one channel signal, and the sound recorded via the other microphone might be recorded into the other channel signal. When microphones are placed at different locations relative to sound source(s) and each other for recording purposes, the contents of one resulting channel signal might be significantly different from the contents of other resulting channel signals. The difference in the contents of the channel signals is dependent upon the spatial relationships between their corresponding microphones and the sound source(s).

At some time after the multiple channel signals have been recorded, one might want to mix the multiple channel signals into an even greater number of output channel signals. For example, one might wish to take two input channel signals and mix them into four output channel signals to produce more of a "surround sound" effect. However, because the approaches described above never really contemplated more than one input channel signal, the foregoing approaches provide no clear way of preserving, indicating, or manipulating the spatial relationship between multiple input channel signals that need to be mixed into multiple output channel signals.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a GUI, which includes multiple indicators, is displayed. Multiple input channel signals are mixed to produce multiple output channel signals. The mixing is performed based on the distance between the indicators' positions in the GUI. According to one embodiment of the invention, the mixing is also performed based on the angle formed between the indicators. Thus, the extent to which an input channel signal is carried by an output channel signal is, in one embodiment of the invention, a function of both the distance between the indicators and an angle formed by the indicators in the GUI.

Example GUI

Figure 1:
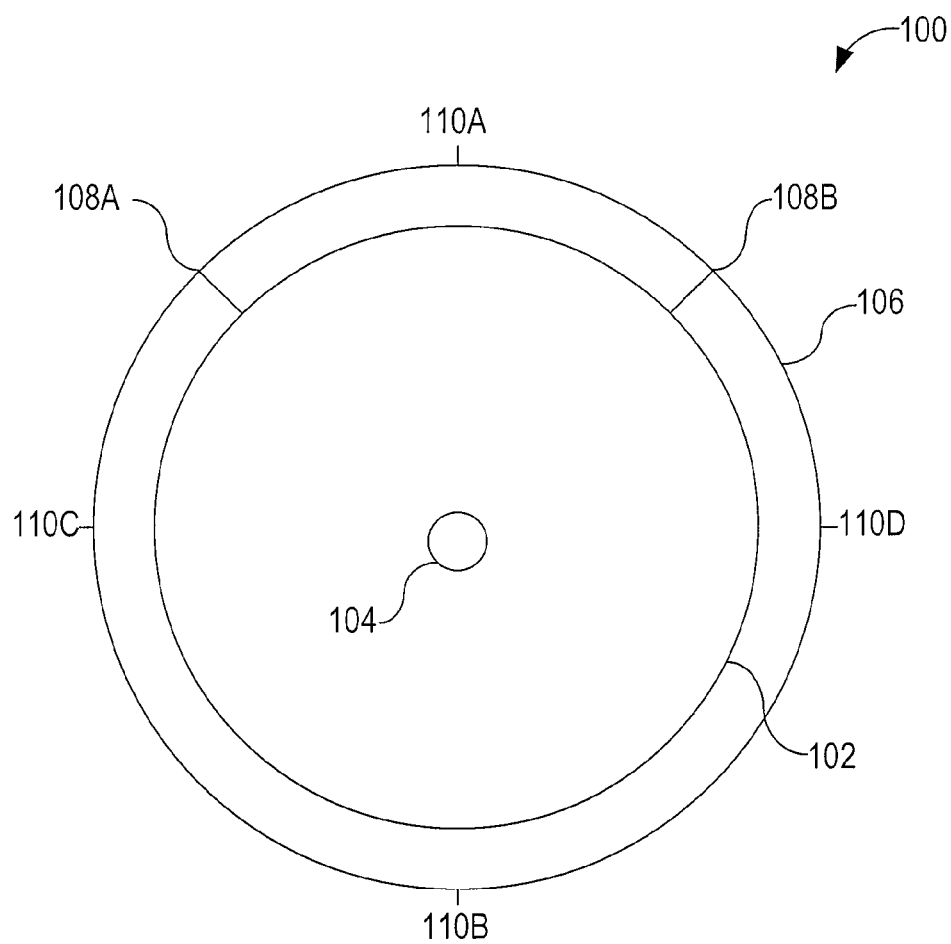
FIG. 1 is a block diagram illustrating an example GUI that includes multiple indicators, according to an embodiment of the invention.
Figure 1:
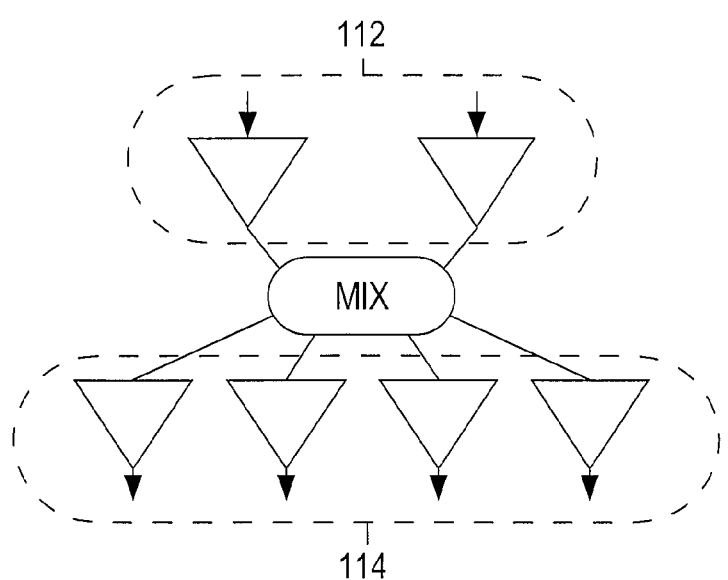

FIG. 1 is a block diagram illustrating an example GUI 100 that includes multiple indicators, according to an embodiment of the invention. GUI 100 comprises a circular area 102 that encompasses a movable floating indicator 104. A ring 106 surrounds circular area 102. Within ring 106 are input channel signal indicators 108A and 108B. On the edges of ring 106 are output channel signal positions 110A-D. Output channel signal positions 110A-D may be, but do not need to be, expressly indicated in GUI 100; output channel signal positions 110A-D may be inferred under some circumstances. In this example, there are two input channel signals 112 that are to be mixed to generate four output channel signals 114.

The presence of indicators 108A-B within ring 106 forms an arc on ring 106 that is bounded by indicators 108A-B. The length of the arc relative to the circumference of ring 106 is representative of the "width" that is given to the input as a whole as the input channel signals are rendered to output channel signals in a particular configuration. The region of ring 106 between indicators 108A-B may be shaded to visibly distinguish this region from the rest of ring 106.

A user may change the position of movable floating indicator 104 within circular area 102. For example, a user may click and drag movable floating indicator 104 from one location to another using a mouse, thereby positioning movable floating indicator 104 closer to or farther away from various ones of output channel signal positions 110A-D.

According to one embodiment of the invention, the positions of indicators 108A-B depend on the position of movable floating indicator 104; when movable floating indicator 104 changes position, the positions of indicators 108A-B on ring 106 may change as well. More specifically, according to one embodiment of the invention, at every moment, an invisible vector originates from the center of circular area 102 and passes through the current position of movable floating indicator 104. Wherever movable floating indicator 104 goes, indicators 108A-B are positioned on ring 106 equidistant from the point at which the invisible vector intersects ring 106. Portions of GUI 100 are re-rendered when movable floating indicator 104 moves, to reflect the new positions of movable floating indicator 104 and/or indicators 108A-B in GUI 100.

Although the movement of movable floating indicator 104 may cause indicators 108A-B to change position on ring 106, the movement of movable floating indicator 104 alone does not cause the length of the arc bounded by indicators 108A-B to change. Thus, according to one embodiment of the invention, the point at which the invisible vector intersects ring 106 is always the midpoint of the arc bounded by indicators 108A-B. The preservation of the length of this arc causes the spatial relationship between the input channel signals to be preserved no matter where movable floating indicator 104 is moved.

For example, if movable floating indicator 104 is moved directly down from the center of circular area 102, then the midpoint of the arc correspondingly moves to the 270-degree position on ring 106 (directly below center). Assuming that the number of degrees occupied by the arc on ring 106 is 60 degrees, indicator 108A is positioned 30 degrees to one side of the midpoint, and indicator 108B is positioned 30 degrees to the other side of the midpoint. Thus, under these circumstances, indicator 108A would move to the 300-degree position on ring 106, and indicator 108B would move to the 240-degree position on ring 106.

Changing Distances Between Input Channel Signals

According to one embodiment of the invention, the distances of the indicators from each other on ring 106 are user-changeable. For example, using a mouse, a user may click on either indicator 108A or 108B and drag that indicator closer to or father away from the other indicator(s) on ring 106. If an indicator is moved closer to the other indicators, then the length of the arc bounded by indicators 108A-B shortens. Alternatively, if an indicator is moved farther from the other indicators, then the length of the arc bounded by indicators 108A-B lengthens. The distances of the indicators from each other influences how the corresponding input channel signals are distributed, intensity-wise, among the output channel signals.

According to one embodiment of the invention, by moving the input channel signals indicators as described above, a user can increase or decrease the length of the input channel signal indicator-bounded arc to occupy as much as 360 degrees or as little as 0 degrees on ring 106.

According to one embodiment of the invention, as an indicator on one side of the midpoint of the arc region is moved some number of degrees toward the midpoint, an indicator on the other side of the midpoint automatically moves the same number of degrees toward the midpoint. According to one embodiment of the invention, as an indicator on one side of the midpoint of the arc region is moved some number of degrees away from the midpoint, an indicator on the other side of the midpoint automatically moves the same number of degrees away from the midpoint. Thus, in one embodiment of the invention, the growth or shrinkage of the arc region occurs symmetrically about the midpoint of the arc region.

Determining Intensities Based on Proximities

The "native" (i.e. pre-mixing) intensity of each input channel signal may vary over time. According to one embodiment of the invention, a plurality of input channel signals are mixed and recorded into a plurality of output channel signals. At each moment during the mixing of the input channel signals into the output channel signals, the extent to which a particular input channel signal's intensity (i.e., volume) is represented within a particular output channel signal at that moment is based on (a) the distance between the indicators, and (b) the particular input channel signal's "native" intensity at that moment. According to one embodiment of the invention, the extent to which a particular input channel signal's intensity is represented within a particular output channel signal at that moment is also based on an angle that is formed between indicators 108A-B, where the vertex of the angle is the center of circular area 102.

Input Constraints

As is described above, according to one embodiment of the invention, ring 106 represents 360 degrees, so that the 0, 90, 180, and 270 degree positions on ring 106 correspond to real-world positions to the right, front, left, and back of the listener, respectively. However, in an alternative embodiment of the invention, a user may specify that the circumference of ring 106 represents some circular arc less than 360 degrees in the real world, relative to the listener. For example, a user may define the entire circumference of ring 106 to represent 60 degrees total—from 30 degrees counterclockwise from a position directly in front of the listener to 30 degrees clockwise from the position directly in front of the listener. Under such circumstances, if the user set positions 110A-D as shown in FIG. 1, position 110A would still correspond to directly in front of the listener, but position 110C would correspond to 15 degrees counterclockwise of directly in front of the listener rather than 90 degrees counterclockwise, and position 110D would correspond to 15 degrees clockwise of directly in front of the listener rather than 90 degrees clockwise.

Output Constraints

According to one embodiment of the invention, instead of containing movable floating indicator 104, circular area 102 comprises a panning knob similar to the panning knob described in the foregoing Background section. In one embodiment of the invention, the extent to which the panning knob is turned clockwise or counterclockwise is represented by a line that extends from the center of circular area 102 to the perimeter of circular area 102. Outside of ring 106, output signal indicators represent the positions of speakers relative to a user who would be located, in the real world, at a position corresponding to the center of circular area 102. A user may select the number and positions of the output signal indicators. Each output signal indicator corresponds to a separate output channel signal.

Figure 2:
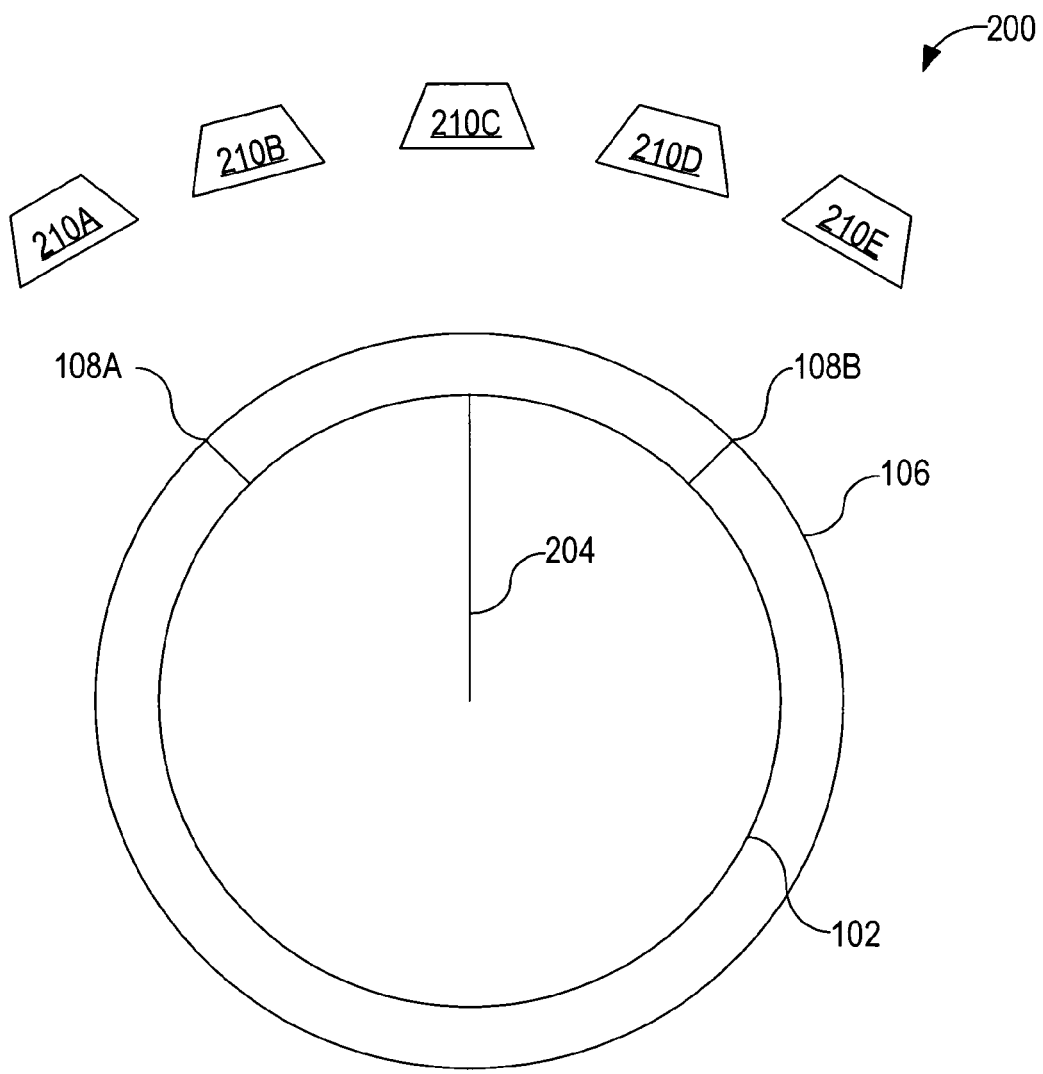
FIG. 2 is a block diagram illustrating an example GUI that includes a panning knob, according to an embodiment of the invention.

FIG. 2 is a block diagram illustrating an example GUI 200 that includes a panning knob, according to an embodiment of the invention. As in FIG. 1, circular area 102 and ring 106 are displayed. Referring to again to FIG. 2, line 204 indicates the attitude of the panning knob; when a user turns the panning knob counterclockwise (using a mouse, keyboard, or other input device, for example), the end of line 204 that abuts the perimeter of circular area 102 moves counterclockwise along the perimeter; when a user turns the panning knob clockwise, the end of line 204 that abuts the perimeter of circular area 102 moves counterclockwise along the perimeter. The other end of line 204 remains at the center of circular area 102 regardless of the attitude of the panning knob.

According to one embodiment of the invention, when the panning knob is turned, the arc region does not move.

In the example shown in FIG. 2, there are five positions 210A-E for five separate output channel signals. Thus, in the example shown in FIG. 2, GUI 200 allows for the mixing of multiple input channel signals into five output channel signals. Each input channel signal may be represented to a different extent in each of the output channel signals, based on the attitude of the panning knob. Changing the arc between indicators 108A-B distributes the sound, including additional speakers/output channel signals when the arc is increased, and reducing the soundfield when the arc is decreased.

Hardware Overview

Figure 3:
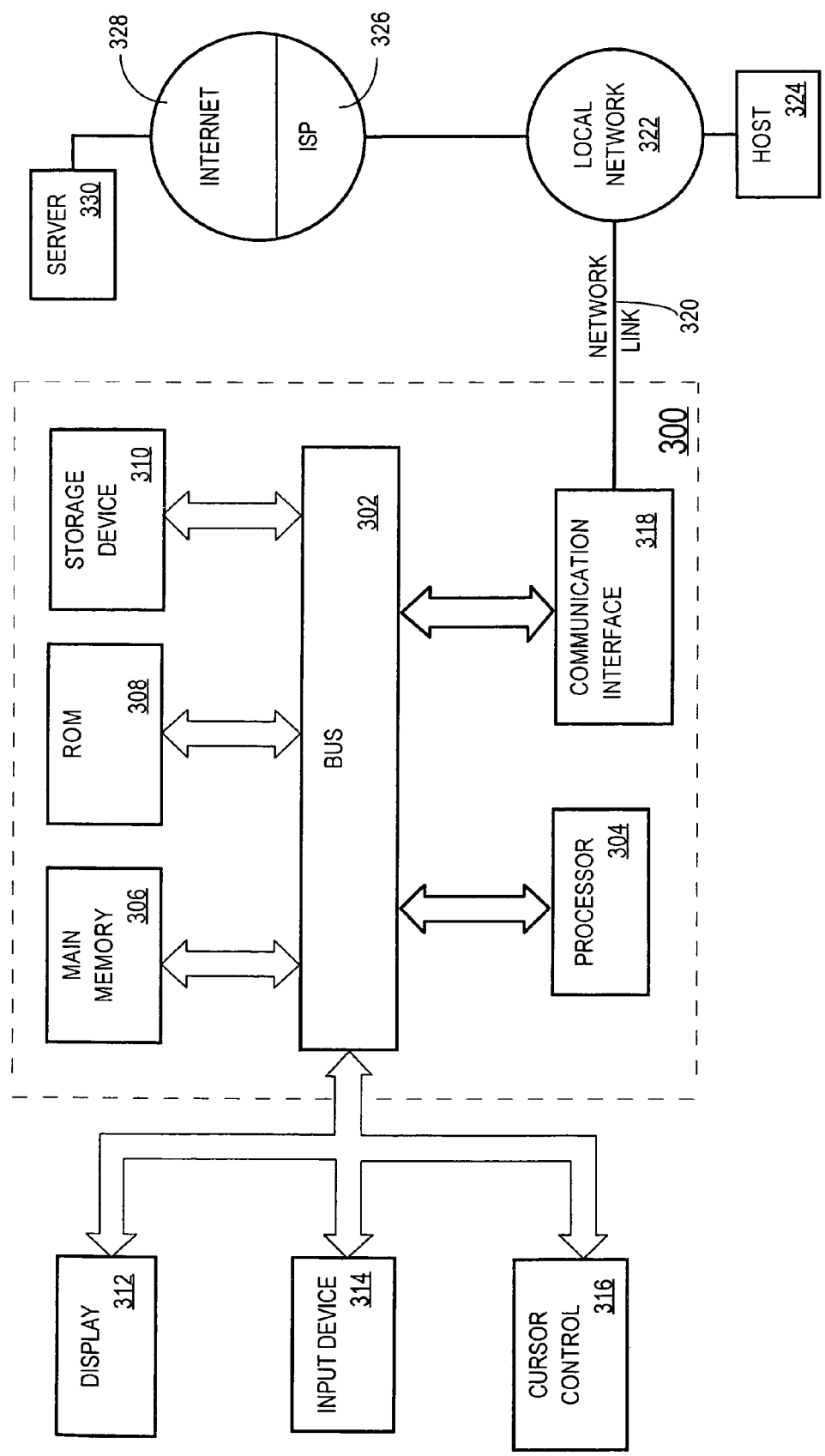
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for generating output channel signals based on input channel signals, the method comprising:
   displaying a graphical user interface (GUI) that includes a plurality of indicators and a movable point that is (a) movable by a user and (b) separate from each indicator in the plurality of indicators; and
   mixing a plurality of input channel signals to produce a plurality of output channel signals;
   wherein, for each output channel signal of the plurality of output channel signals, the relative intensities of the input channel signals on that output channel signal are based on (a) a distance between the indicators and (b) an angle formed by the indicators on the GUI;
   wherein the indicators are positioned on a ring that encircles a circular area in the GUI;
   wherein a vector originates from a center of the circular area, passes through the user-movable point, and intersects the ring;
   in response to a user's movement of the movable point in the GUI, changing absolute positions of the plurality of indicators along the ring based on a position of the movable point after the user's movement of the movable point;
   wherein changing positions of the plurality of indicators in response to the user's movement of the moveable point in the GUI comprises positioning the indicators equidistant from a point at which the vector intersects the ring;
   wherein a portion of a perimeter of the ring is bounded by the indicators;
   wherein the movement of the user-movable point does not alter a length of the portion.

2. The method of claim 1, wherein the vector is invisible.

3. A computer-readable storage medium storing one or more sequences of instructions which, when executed by one or more processors, causes the one or more processors to perform the method recited in claim 2.

4. The method of claim 1, further comprising:
   changing the length of the portion in response to user input.

5. A computer-readable storage medium storing one or more sequences of instructions which, when executed by one or more processors, causes the one or more processors to perform the method recited in claim 4.

6. The method of claim 1, further comprising:
   receiving user input that indicates how many degrees the ring represents.

7. A computer-readable storage medium storing one or more sequences of instructions which, when executed by one or more processors, causes the one or more processors to perform the method recited in claim 6.

8. The method of claim 1, further comprising:
   receiving, for each output channel signal of the plurality of output channel signals, user input that indicates a position in the GUI.

9. A computer-readable storage medium storing one or more sequences of instructions which, when executed by one or more processors, causes the one or more processors to perform the method recited in claim 8.

10. The method of claim 1, further comprising:
    determining, for each particular input channel signal of the plurality of input channel signals, an extent to which the particular input channel signal is represented, intensity-wise, in a particular output channel signal of the plurality of output channel signals;
    wherein the extent to which the particular input channel signal is represented in the particular output channel signal is based on a proximity, in the GUI, of an indicator, which corresponds to the particular input channel signal, to a GUI position corresponding to the particular output channel signal.

11. A computer-readable storage medium storing one or more sequences of instructions which, when executed by one or more processors, causes the one or more processors to perform the method recited in claim 10.

12. A computer-readable storage medium storing one or more sequences of instructions which, when executed by one or more processors, causes the one or more processors to perform the method recited in claim 1.

13. The method of claim 1, wherein the step of changing absolute positions of the plurality of indicators along the ring comprises:
    changing positions of each of the plurality of indicators relative to the plurality of indicators' positions prior to the user's movement of the movable point.

14. A computer-readable storage medium storing one or more sequences of instructions which, when executed by one or more processors, causes the one or more processors to perform the method recited in claim 13.

15. A computer-implemented method comprising:
    displaying a graphical user interface (GUI) that includes a plurality of indicators; and
    in response to a movement of a user-movable point in the GUI, changing positions of the plurality of indicators in the GUI, relative to the plurality of indicators' positions in the GUI prior to the movement of the user-movable point, based on a position of the user-movable point in the GUI;
    wherein the indicators are positioned on a ring that encircles a circular area in the GUI;
    wherein an invisible vector originates from the center of the circular area, passes through the user-movable point, and intersects the ring;
    wherein, throughout the movement, the indicators are positioned equidistant from a point at which the vector intersects the ring;

wherein a portion of a perimeter of the ring is bounded by the indicators; and wherein the movement of the user-movable point does not alter a length of the portion, and wherein the length of the portion represents a width of a sound field.

16. A computer-readable storage medium storing one or more sequences of instructions which, when executed by one or more processors, causes the one or more processors to perform the method recited in claim 15.

17. The method of claim 15, wherein the step of changing positions of the plurality of indicators in the GUI comprises:

changing absolute positions of each of the plurality of indicators in the GUI.

18. A computer-readable storage medium storing one or more sequences of instructions which, when executed by one or more processors, causes the one or more processors to perform the method recited in claim 17.

* * * * *